(12) United States Patent
Jaganathan et al.

(10) Patent No.: US 8,544,083 B2
(45) Date of Patent: Sep. 24, 2013

(54) IDENTIFICATION SECURITY ELEVATION

(75) Inventors: Karthik Jaganathan, Seattle, WA (US);
Tanmoy Dutta, Redmond, WA (US);
Eric C Perlin, Redmond, WA (US);
Steven L. Hiskey, Monroe, WA (US);
Cezar Ungureanasu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 626 days.

(21) Appl. No.: 12/388,679

(22) Filed: Feb. 19, 2009

(65) Prior Publication Data

US 2010/0212008 A1    Aug. 19, 2010

(51) Int. Cl.
*G06F 21/00*    (2013.01)
(52) U.S. Cl.
USPC ......... 726/17; 726/2; 726/19; 726/21; 726/26
(58) Field of Classification Search
USPC .................................. 713/187, 188
See application file for complete search history.

(56) References Cited

U.S. PATENT DOCUMENTS

| | | | | |
|---|---|---|---|---|
| 5,978,484 A * | 11/1999 | Apperson et al. | ............... | 705/54 |
| 6,308,274 B1 * | 10/2001 | Swift | ............... | 726/9 |
| 6,691,232 B1 * | 2/2004 | Wood et al. | ............... | 726/6 |
| 7,035,850 B2 * | 4/2006 | Arai et al. | ............... | 1/1 |
| 7,526,798 B2 * | 4/2009 | Chao et al. | ............... | 726/5 |
| 2005/0091535 A1 * | 4/2005 | Kavalam et al. | ............... | 713/201 |
| 2006/0048131 A1 * | 3/2006 | Napier et al. | ............... | 717/168 |

* cited by examiner

*Primary Examiner* — William Powers
*Assistant Examiner* — Imhotep Durham
(74) *Attorney, Agent, or Firm* — Wolfe-SBMC

(57) ABSTRACT

Security elevation techniques are described. In an implementation, a request is received for additional security access beyond that which is currently specified for a program. An identity that describes the program is checked with a plurality of conditions. The security level is automatically elevated to grant the additional security access when the identity corresponds to one of the conditions that indicates that the security level is to be automatically elevated.

20 Claims, 6 Drawing Sheets

IDENTIFICATION SECURITY ELEVATION

BACKGROUND

A computer may be configured to have several security levels, such as to control what activities may be performed with the computer. For example, the security levels may include an administrator level and a user level, which may be associated with accounts that are accessible via corresponding credentials.

The administrator level may permit an administrator to perform more activities than may be performed by accessing the computer at a user level. For example, an administrator account, operating at an administrator level, may permit the administrator to install drivers, change computer settings (e.g., system settings), change account settings, and so on.

In contrast, a user account, operating at a user level, may prohibit a user from installing a driver, changing account settings, and so forth. As a result, when the computer is accessed using an administrator level, more changes may be made that impact how the computer functions in comparison to a user who may be restricted to changing user settings.

SUMMARY

Security elevation techniques are described. In an implementation, a request is received for additional security access beyond that which is currently specified for a program. An identity that describes the program is checked with a plurality of conditions. The security level is automatically elevated to grant the additional security access when the identity corresponds to one of the conditions that indicates that the security level is to be automatically elevated.

In an implementation, one or more computer-readable media comprise instructions that are executable to generate a background service. The background service is operable to verify that an identity, that describes a program, is bound to data that forms the program. The verification is performed in response to a request for security access beyond a security level that is currently specified for the program. The background service is also operable to elevate the security level without manual authorization when the identity corresponds to one of a plurality of conditions that is associated with automatic security level elevation.

In an implementation, one or more computer-readable media comprise instructions that are executable to check an identity of a program with a list of conditions in response to a request for elevated security access. The identity is included in a hash with data that forms the program. The hash is included in a file signed with a certificate. The instructions are also operable to elevate the program's security access automatically when the identity corresponds to one of the conditions in the list that indicates that elevated security access is permitted and the certificate is associated with one of the conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Computers may be configured with different security levels to control what activities may be performed with the computer. By configuring computers in this manner, inadvertent activities, such as changing user settings, may be avoided when the computer is accessed at a user level. In addition, when accessing the computer at a user level, potential damage from malware infection may be minimized in comparison to accessing the computer via an administrator level. For example, a user level may prevent the computer from accessing tools that are associated with an administrator level.

Techniques are described which may be used to elevate a program's security level. In an implementation, a check is performed to determine whether an identity of a program corresponds to a condition included in a plurality of conditions. When the identity corresponds to a condition that is associated with automatic security level elevation, the security level for the program may be elevated without receipt of a manual authorization to elevate the program's security access.

In one or more embodiments, the conditions are individually associated with a procedure that is to be performed before the security level of a related program is elevated over that which is currently specified for the related program. Thus, upon receipt of the request, the procedure may be performed before the program's security access is elevated beyond that which is currently allowed.

In the following discussion, an example environment and systems are first described that are operable to perform one or more techniques that may be use to elevate a program's security access. Example procedures are then described that may be implemented using the example environment as well as other environments. Accordingly, implementation of the procedures is not limited to the environment and the environment is not limited to implementation of the procedures.

Example Environment

Figure 1:
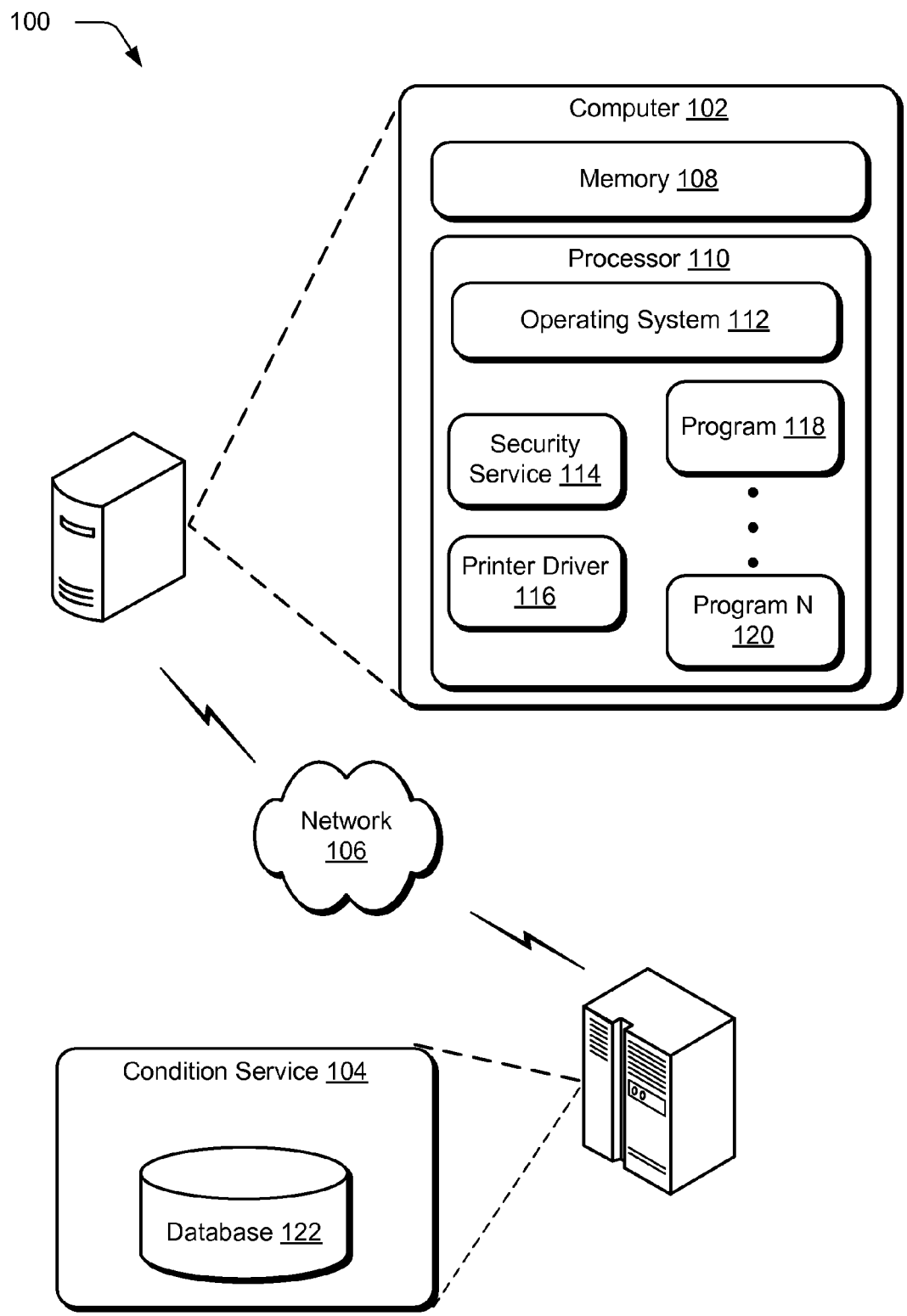
FIG. 1 is an illustration of an environment in an example implementation that is operable to perform security elevation.

FIG. 1 is an illustration of an environment 100 in an example implementation that is operable to employ security elevation techniques. The illustrated environment 100 includes a computer 102 and condition service 104 coupled by a network 106. For example, the condition service 104 may provide rules from a group policy for the network 106. In the following discussion, the computer 102, the condition service 104, and the network 106 may be representative of one or more entities.

As illustrated, the computer 102 includes a memory 108 and a processor 110. While the computer 102 is illustrated as including the memory 108 and the processor 110, the memory 108 and/or the processor 110 may be representative of one or more devices, e.g., the processor 110 may be representative of a plurality of central processing units. Processors are not limited by the materials from which they are formed or the processing mechanisms employed therein. For example, the processor may be comprised of semiconductors that execute instructions.

Although one memory 108 is illustrated, a wide variety of types and combinations of memory may be employed, such as random access memory (RAM), read only memory (ROM), hard disk memory, removable medium memory and other types of computer-readable media.

The computer 102 is also illustrated as executing an operating system 112 on the processor 110, which is also storable in the memory 108. The operating system 112 is representative of functionality to "abstract" underlying functionality of the computer 102. The operating system 112 may, for example, provide a foundation for execution of applications on the computer 102 without the application having to "know" the specific configuration of the computer 102.

As further illustrated, a security service 114, a printer driver 116, and one or more programs 118, 120 (e.g., applications) may execute on processor 110. The security service 114, the printer driver 116, and the programs 118, 120 may also be stored in memory 108. In other instances, the security service 114 may be provided by a server available via the network 106. In an example, program 120 may request security level elevation for program 118 that is currently stored in memory 108.

The security service 114 is representative of functionality to manage security level elevation based on an identity that describes the program. In one or more embodiments, the security service 114 executes in the computer's background. For example, the security service 114 may be configured to execute in a manner that makes the security service 114 transparent to a user of the computer 102. It is to be readily apparent that a wide variety of other examples are also contemplated, such as remote execution of the security service 114, e.g., "over the cloud" by a third-party service that is accessible via the network 106.

While administrator and user levels are discussed, it is to be apparent that multiple security levels, having various degrees of security access, may be implemented. Further, for the purposes of example only and not limitation, an administrator level may refer to a security level that may, to some degree, perform more activities than a user level. It is also to be apparent that one or more accounts may be associated with a particular security level. For example, an administrator account may be associated with an administrator level that permits additional access than that of a user account that may access the computer 102 at a user level.

The security service 114 may check one or more identities of a program for which security level elevation is requested, with a plurality of conditions. The request for security level elevation may be made by another program on behalf of the program, by the program itself, and so forth. Security level elevation may be in comparison to a security level currently specified, e.g., user level. For example, although a program 118 may execute at a user level, the program 120 may request that the program's security level (e.g., program 118) be elevated to an administrator level of security access to install a driver or access tools. In this way, when loading of the printer driver 116 is initiated, the program 120 may request administrator level security access to load the printer driver 116 for program 118. Example identities may provide some information about the program for which security level elevation is requested, for example, identities may include a hash, a path, an entity, a program name, a file name, a version, and so on.

The program 120 may request security level elevation when the program 118 is to perform an activity that occurs infrequently. For example, a word processing application may request security level elevation for a program used to load a printer driver 116 when the printer driver 116 is to be installed. In the foregoing example, installation of the printer driver 116 may be associated with greater security access as installation of the printer driver 116 may impact how the computer 102 functions. Thus, while the word processing application may execute at a user level for a majority of the time, the program used to load the printer driver 116 for the word processor may be associated with an administrator level.

The security service 114 may check the identity with a plurality of conditions to identify the program 118. Each of the conditions may be associated with information that describes a related program, information associated with the related program's reputation, and so forth. For example, a condition may be a hash, a path, an entity, a program name, a portion of a program name, a file name, a version, and so forth for a program. Other information may include whether manual authorization is to be used, what security levels the program is permitted to use, a public key associated with the program, and so on. In this way, the conditions may be used to identify a procedure that is to be performed in response to a request from the application for additional security access.

The security service 114 may maintain a list that includes the plurality of conditions. In other instances, the plurality of conditions may be included in a policy. For example, the computer 102 may include a policy that has a plurality of conditions for programs 118, 120 on the computer 102. In other instances, the policy may include conditions for programs that are commonly used by the computing public at large. A variety of other examples are also contemplated, further discussion of which may be found in relation to FIG. 2.

As further illustrated, the condition service 104 is representative of functionality to provide conditions, rules, and/or information associated with programs. For instance, the condition service 104 may be used to distribute rules included in a group policy to computers associated with the network 106. The condition service 104 may be accessed via the network 110. In some embodiments, the condition service 104 includes a database 122 that is configured to include conditions associated with a program, such as at what security levels the program may operate, what procedure is to be performed, and so on. In some instances, the condition service 104 may be provided by a server that performs other activities on behalf of the computer 102, such as setting group policies for the computer 102 and other computers connected by the network. In an example, the server may scan the computer 102 for malware. While the database 122 is illustrated within the condition service 104, in other instances the database 122 may be external to the condition service 104 and/or a server providing the condition service 104.

Generally, any of the functions described herein can be implemented using software, firmware (e.g., fixed logic circuitry), manual processing, or a combination of these implementations. The terms "module," "functionality," "service," and "logic" as used herein generally represent software, firmware, or a combination of software and firmware. In the case of a software implementation, the module, functionality, service, or logic represents program code that performs specified tasks when executed on a processor (e.g., CPU or CPUs). The program code can be stored in one or more computer readable memory devices, and so on. The features of security elevation techniques described herein are platform-independent, meaning that the techniques may be implemented on a variety of commercial computing platforms having a variety of processors.

Figure 2:
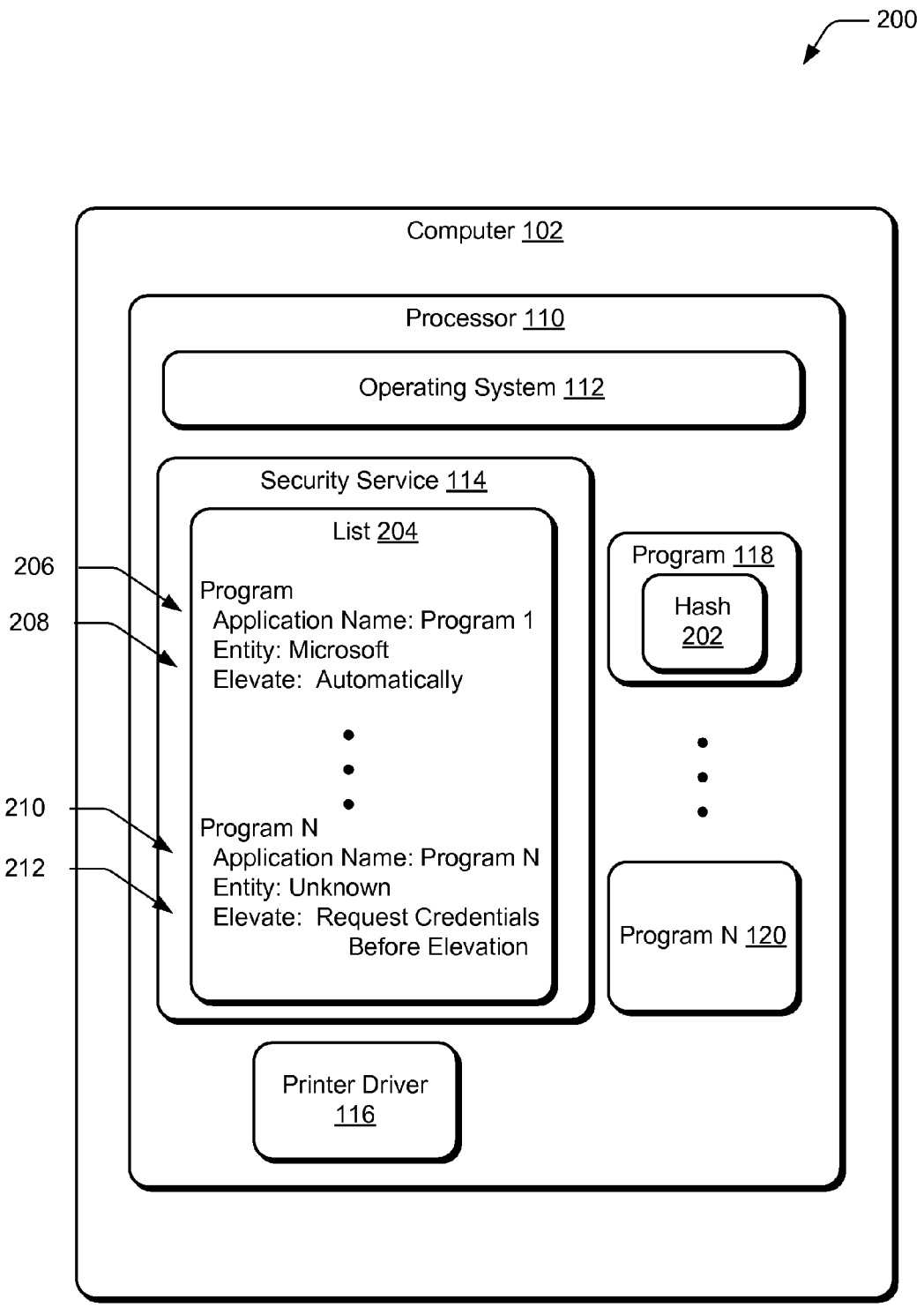
FIG. 2 is an illustration of a system in an example implementation in which a computer of FIG. 1 is shown in greater detail.

FIG. 2 depicts a system 200 in an example implementation in which the computer 102 of FIG. 1 is shown in greater detail. By way of example, for discussion purposes alone and not limitation, presume program 120 has requested additional security access for program 118 beyond that which it is currently specified for program 118. For example, program 120 may request additional security access before program 118 is executed. Thus, program 120 may request that program 118 be allowed to operate at an administrator security level in comparison to a level at which the computer 102 is currently operating. For example, program 118 may be provided with additional security access to load the printer driver 116.

As a result of the request for access, the security service 114 may obtain the one or more identities from the program 118. For instance, the security service 114 may retrieve the identity from the program 118. In other instances, an identity may be sent with the request.

The identity may be included in a hash 204 with data that forms the program 118. For example, the identity may be included with at least a portion of the data that forms the program 118 and/or included in the program itself. Thus, the hash 204 may also be included with the program 118 and may serve as an identity. In some implementations, a private key and/or a certificate may be used with a file that includes the program 118. Thus, an identity may be bound to data that forms the program 118, such as the certificate, and the private key may be bound to data that forms the program 118.

In an implementation, the certificate may be guaranteed/issued by a third party. For example, an entity that is the source of the program 118 (e.g., an independent software vendor) may sign a file that contains the hash 204 with a private key and a certificate. In this way, the file may be cryptographically protected and the security service 114 may use an entity associated with the program 118 as an identity of the program. Thus, the security service 114 may decrypt the file with a public key that corresponds to the private key used to sign the file that includes the hash 204. In some implementations, the security service 114 may obtain the public key from the condition service 104.

The security service 114 may check the identity with the conditions in the list 204. For example, the security service 114 may check to determine whether the identity corresponds to one of the plurality of conditions. For example, the identity may be a path %programfiles%\someapp\app.exe while a condition may be a path that starts with %programfiles%\someapp. In one or more implementations, each of the conditions in the list may be associated with a procedure that is to be performed before the program's security level is elevated. By way of example only and not limitation, presume program 118 has an identity that corresponds to the condition "program 1." Thus, as illustrated, the program 118 may be associated with an automatic elevation procedure 208. In this way the security service 114 may automatically elevate the security level for the program 118 without receipt of manual authorization.

In further examples, the conditions may be associated by type. For example, conditions associated with a particular computer manufacturer may implement a common procedure, e.g., auto elevate. In other instances, condition types may be based on a common characteristic, e.g., the condition is associated with a driver, a tool, a controller, and so on.

As is to be appreciated, a variety of identities may be used as the basis for the check. While a path for the program 118 (e.g., file path) may serve as an identity, in some implementations, the identity is not a path that is used to access the program 118. By not using the path as a basis for the check, other programs that may operate from the path may not be substituted for the program 118.

In another example, when a request for additional security access beyond that which it is currently allotted is received by the security service 114 (such as for program N 120), the security service 114 may present a prompt. The prompt may request that a user manually authorize security level elevation by filling-in credentials (e.g., user name and password) before the security service 114 elevates the security level for program N 120. The security service 114 may present the prompt based on checking program N 120 with the list that includes the condition program name N 210. As illustrated, the condition program name N is associated with the procedure that presents a prompt that requests credentials 212. Upon receiving proper credentials, the security service 114 may elevate the security level for program N 120.

A wide variety of other examples are also contemplated. For example, in some instances whether a program's security level is elevated may be in part based on the user. For example, while the program's security level may be elevated for a first user, the program's security level may not be elevated for a second user. In other instances, the second user may be presented with a prompt before its security level is elevated, while the program may be permitted to automatically elevate for the first user.

Figure 3:
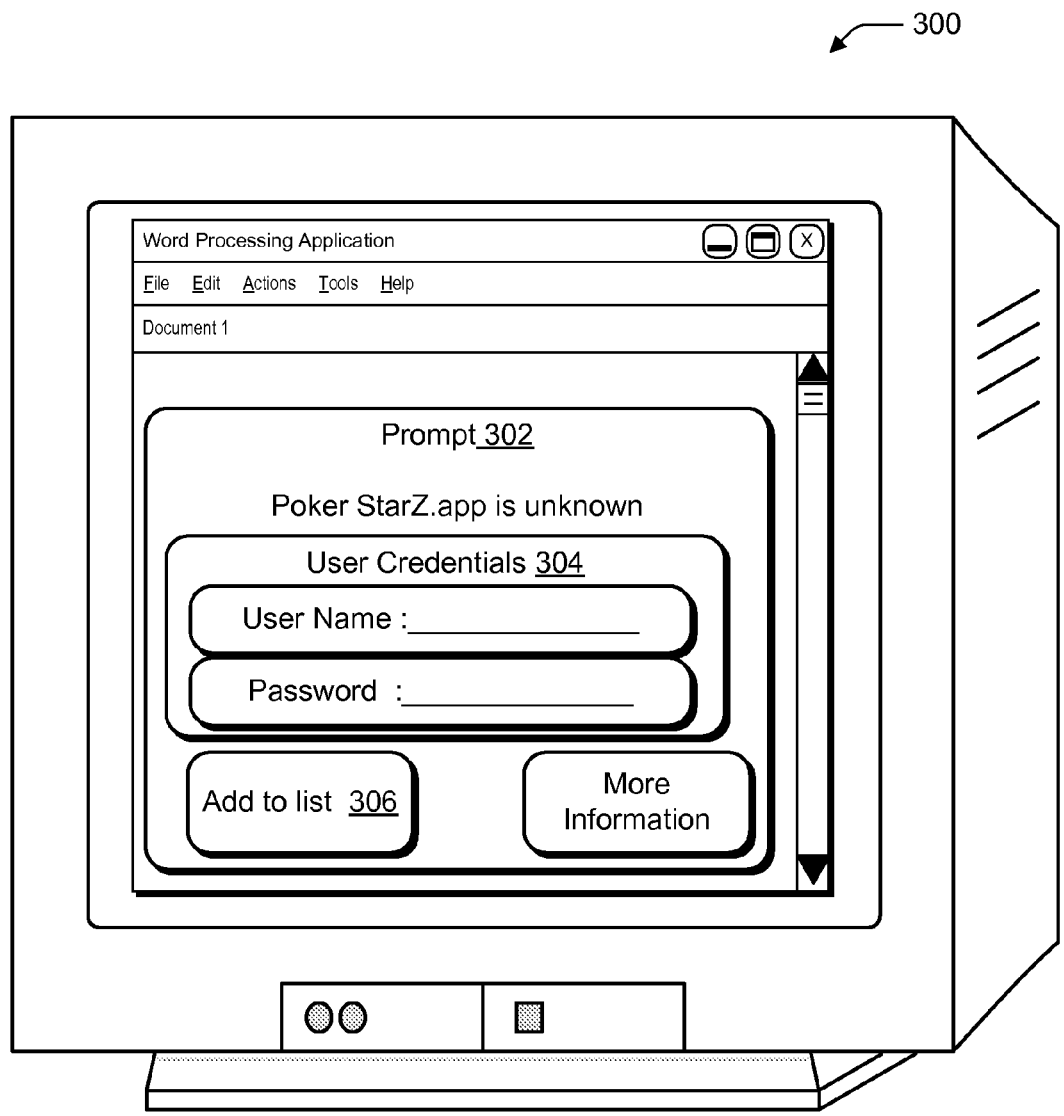
FIG. 3 is an illustration of a system in an example implementation showing presenting a prompt that requests credentials.

FIG. 3 illustrates a display 300 that is used to present a prompt 302 that requests credentials 304. For example, prompt 302 may be presented before the security level is elevated for program N 120. In response to receipt of proper credentials, the security service 114 may elevate the security level of program N. In contrast, when proper credentials are not received, the security level for program N may be maintained at its current level.

In some instances, the prompt may permit the inclusion of the identity into the list/the plurality of conditions. For example, user selection of "add to list" button 306 may include the identity and/or information related to program N in the list 202. In this way, a user may permit the security service 114 to subsequently elevate the security level automatically for program N 120 without receipt of a manual authorization. In still further instances, the security service 114 may automatically include the identity and/or other related information once manual authorization has been performed a specified number of times.

Figure 4:
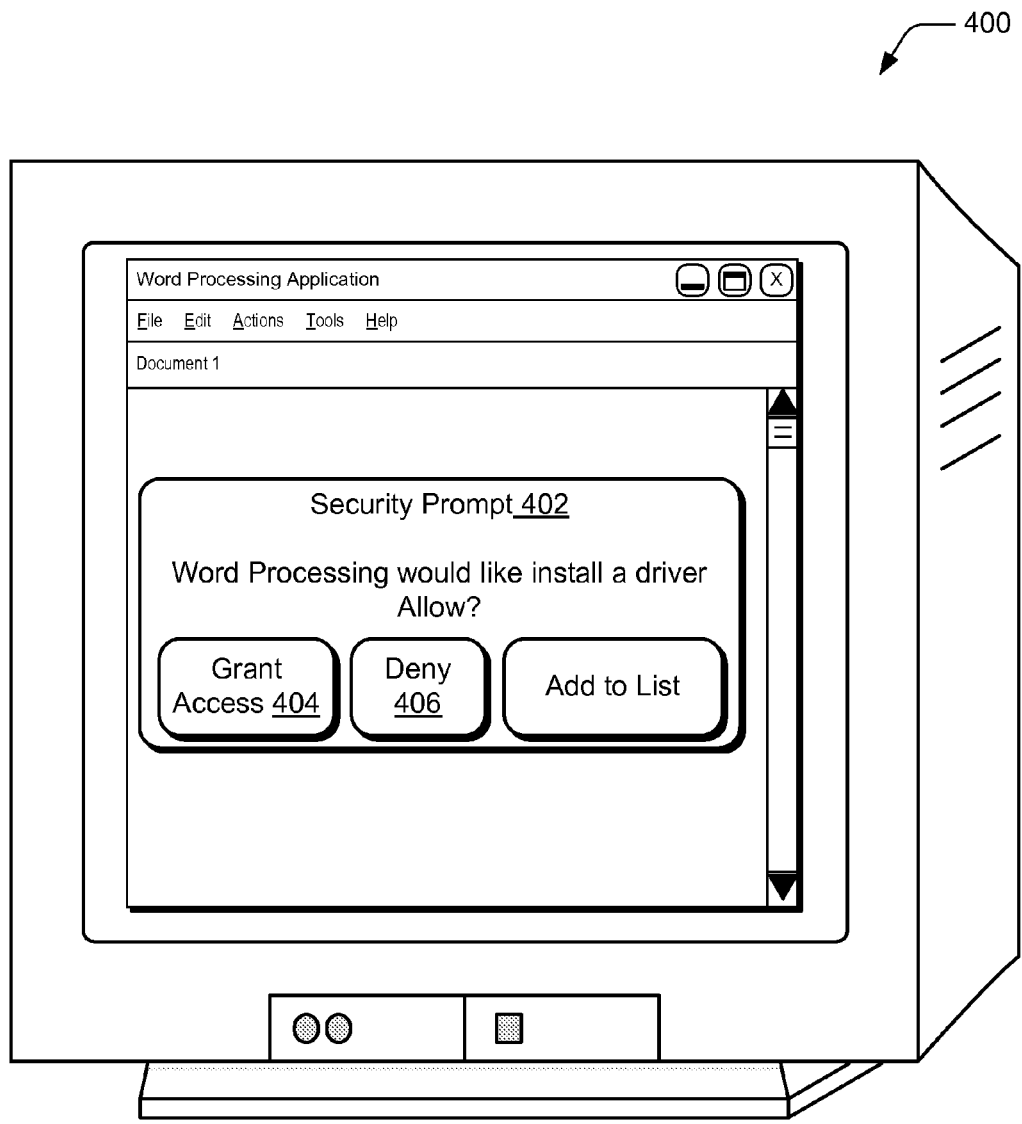
FIG. 4 is an illustration of a system in an example implementation showing presenting a prompt that requests manual authorization.

FIG. 4 illustrates a display 400 presenting a prompt 402 that requests manual authorization in order to elevate a program's security level. The prompt 402 may be presented before the program's security level is elevated. In response to receiving an input that indicates additional security access is to be granted (e.g., select grant button 404), the security service 114 may elevate the security level of the program. In contrast, selection of a deny button 406 may maintain the program's current security level.

A variety of other examples of security elevation systems, techniques, and approaches are also contemplated, further discussion of which may be found in relation to the following procedures.

Example Procedures

The following discussion describes identification based security elevation techniques that may be implemented utilizing the previously described systems, techniques, approaches, and devices. Aspects of each of the techniques may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, and the displays 300, 400 of FIGS. 3 and 4.

Figure 5:
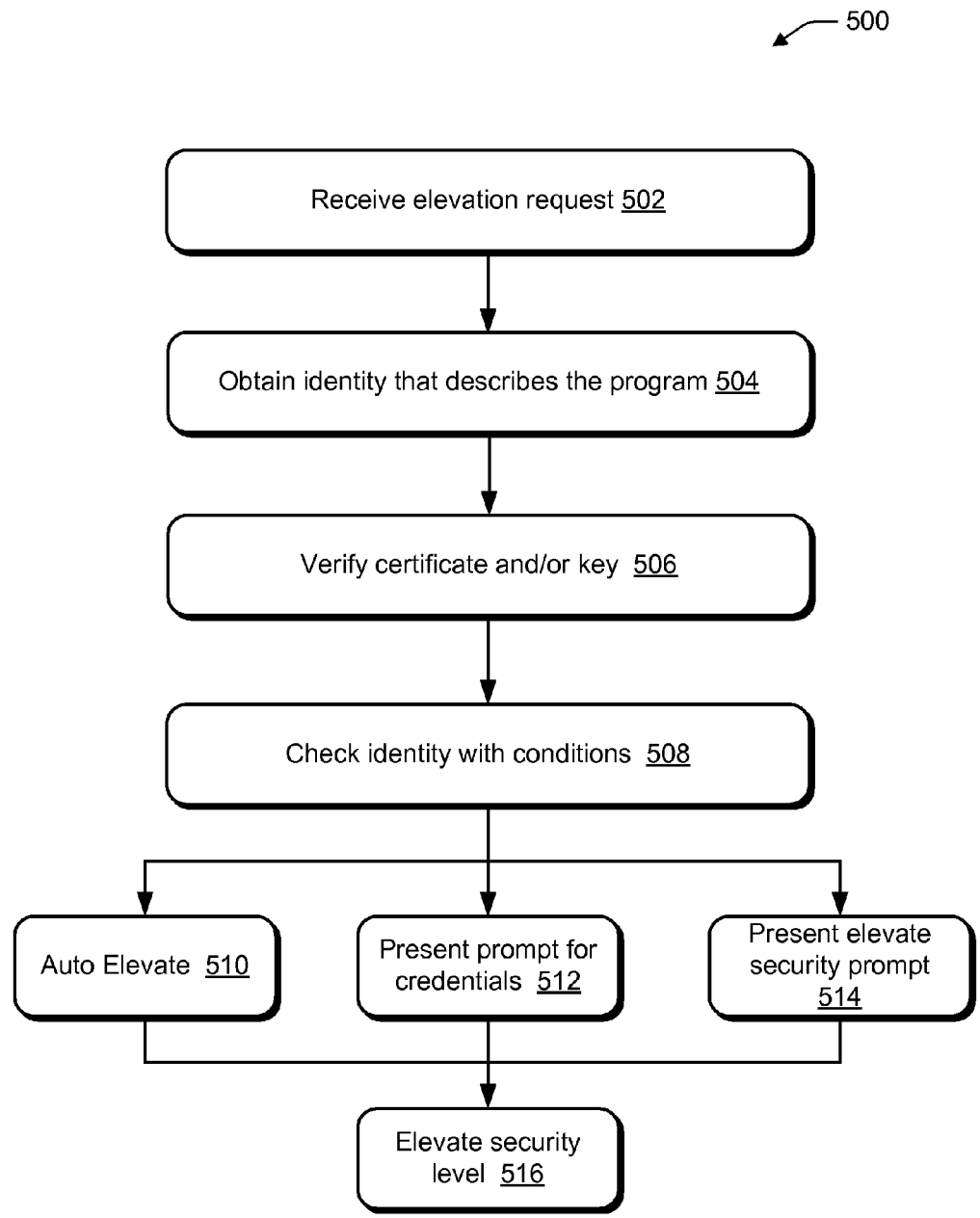
FIG. 5 is a flow diagram depicting a procedure in an example implementation that implements security elevation techniques.

FIG. 5 depicts a procedure 500 in an example implementation in which security elevation techniques are implemented. A request is received for additional security access beyond that which is currently specified for a program (block 502). For example, the program may request additional security access to retrieve an update from the Internet. In other instances, another program may request additional security access for the program that is designated in the request.

One or more identities of the program are obtained that describe the program (block 504). The identities may provide some information about the program. Example identities may include the program's name, a file extension, a version of the program 118, a path for the program 118 (e.g., file path), a hash 204, a file name, an entity associated with the program, and so on. While the program's path may be used as an identity, in some implementations, the identity is not the program's path.

The identity may be the hash 202 that is bound to the program 118. For example, the hash 202 may include data that forms the program 118. In one or more instances, a file that contains the hash 202 may be signed with a certificate and a key. The key corresponds with another key so that the file may be encrypted and decrypted.

In one or more implementations, a verification may be performed (block 506) when the identity is bound to the data that forms the program using a certificate and/or key. For example, the security service 114 may verify that a file including the identity and data from the program 118 is currently bound with the certificate and/or key.

A check is performed to determine whether the identity corresponds to one of a plurality of conditions (block 508). The conditions may be included in a list maintained by the security service 114 or in a policy on the computer 102 performing the procedure. When the identity does not correspond to at least one condition included in the list, an identity service 104 may obtain a condition that corresponds to the identity. A prompt may be used to alert a user when the identity does not correspond to one of the conditions. For example, a prompt may request entry of credentials (e.g., a user name and password) to elevate the program's security level when the identity does not correspond with at least one of the conditions.

In one or more embodiments, the conditions may be individually associated with a procedure that is to be performed before elevating the program's security level. Example procedures may include but are not limited to automatically elevating the security level for the program (block 510), presenting a prompt that requests manual authorization, and so forth. Manual authorization may include a response to a request for credentials (block 512), an input that indicates security elevation is to be performed (block 514) (e.g., select elevate security button), and so on. Thus, when the identity corresponds to one of the conditions, the procedure associated with the condition is performed.

The security level for the program is elevated (block 516). When a procedure that involves manual authentication (e.g., credentials or receive input indicating security elevation) is used, the security level may be elevated upon receipt of proper manual authentication. In a scenario implementing an auto elevate procedure, the security level for the program may be elevated without receipt of a manual authorization. A variety of other examples are also contemplated without departing from the spirit and scope thereof.

Figure 6:
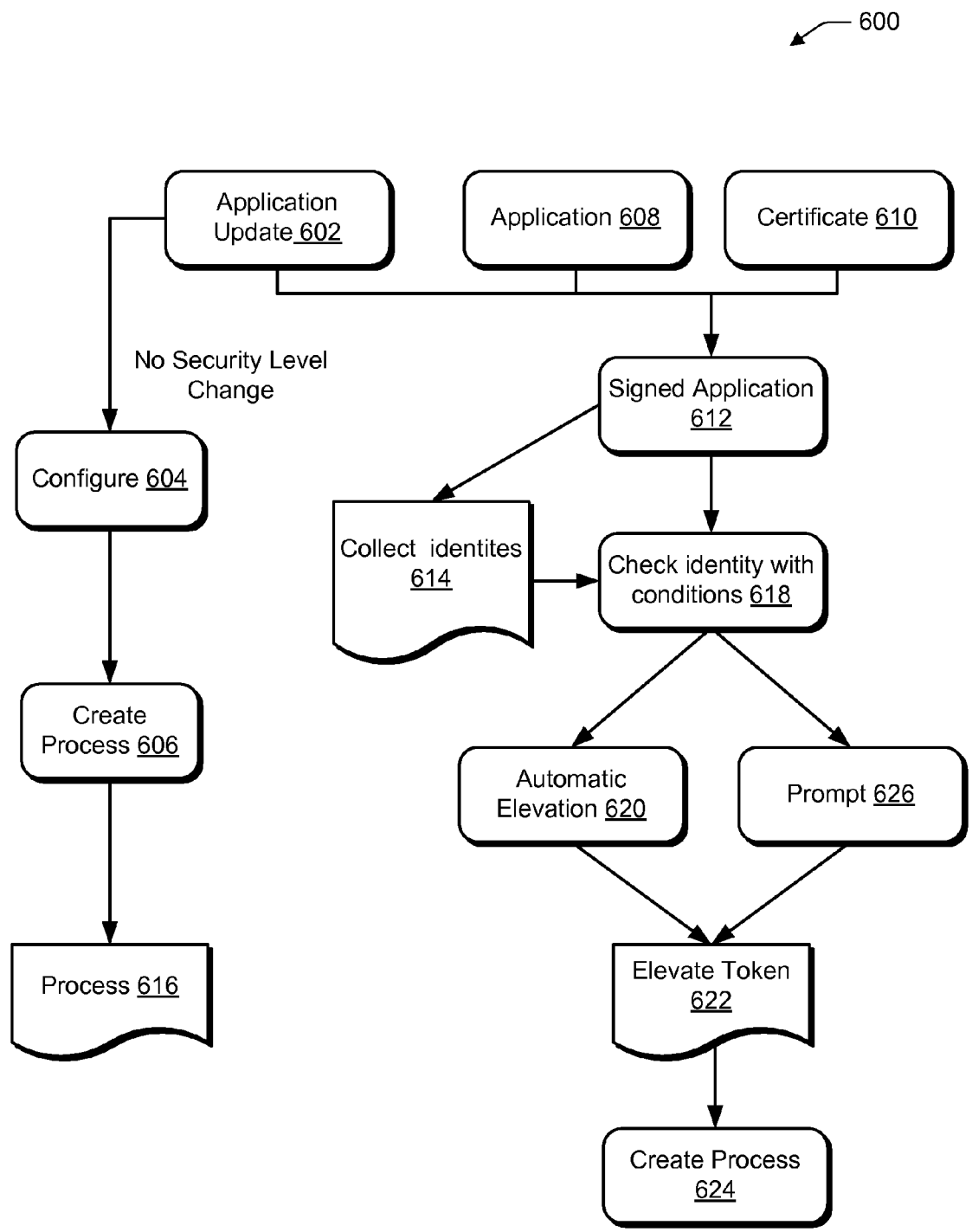
FIG. 6 is a flow diagram depicting a procedure in an example implementation that implements security elevation techniques for an application update.

FIG. 6 depicts a procedure 600 in an example implementation in which security elevation techniques are implemented for an application update. When the update does not involve additional security access, the application update (block 602) may be included in a configure procedure (block 604) and a create process may be performed (block 606).

In contrast, when a security level is to be elevated automatically, the application update (block 602), an application (block 608) and a certificate (block 610) may be included in a signed application (block 612). For example, the certificate (block 610), the application (block 608), and a file that includes the application update (block 602) may be signed with a private key.

As illustrated, identities from the signed application are collected and may be included in a process token (block 614). For example, the identities may be added to the process token such that the process token claims particular identities associated with the signed application (block 612).

With the signed application (block 612), a check may be performed to determine whether the collected identities individually correspond to conditions in a plurality of conditions (block 618). The check may be performed when the application requests additional security access to update the application (block 610). As noted above, the plurality of conditions may be included in a list or included in a policy on the computer 102.

When the identity corresponds to one of the conditions, a procedure associated with the condition may be performed. For example, when the condition is associated with an automatic elevate procedure, the security level for the signed application may be automatically elevated (block 620). For example, automatic elevation may be performed without presenting a prompt that requests manual authorization. A token for the signed application may be elevated (block 622) and a create process (block 624) performed. For example, the token may be updated to indicate the signed application's elevated security level.

In contrast, when the check indicates that the identity corresponds to a condition associated with a prompt procedure (block 626), the prompt may be presented. For example, the prompt may be request credentials or an input that indicates the application's security level is to be elevated. The token's security level may be elevated upon successful completion of the manual authorization and the create process (block 624) is performed.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving a request from a first program on behalf of a second program that is identifiable using multiple identities that each describe the second program and for additional security access beyond that which is currently specified for the second program, the request including at least one of the identities that describes the second program;
checking the at least one of the identities that describes the second program with a plurality of conditions to determine whether the at least one identity corresponds to at least one of the conditions that causes one of a program path, a program manufacturer, a program name, or a program version to be checked, each of the conditions:
corresponds to particular identities such that correspondence of the at least one identity to a condition does not indicate correspondence of another one of the identities that describes the second program to the condition and non-correspondence of the at least one identity to the condition does not indicate non-correspondence of the other identities to the condition; and
is associated with a procedure that is to be performed before a security level for the second program is elevated above a current security level for the second program to grant the additional security access; and
automatically elevating the security level for the second program to grant the additional security access when the at least one identity corresponds to a condition that indicates that the security level is to be automatically elevated.

2. A method as described in claim 1, further comprising presenting a prompt that is to be completed before the security level for the second program is elevated when the at least one identity corresponds to a condition that indicates that a manual authorization is to be received before the security level for the second program is elevated to grant the additional security access.

3. A method as described in claim 2, wherein the prompt is configured to request one or more of:
a credential, or
an input that indicates security elevation is to be performed.

4. A method as described in claim 1, further comprising including one or more of the multiple identities in the plurality of conditions responsive to receipt of a manual authorization that authorizes elevation of the security level for the second program to grant the additional security access.

5. A method as described in claim 1, wherein the second program is an application.

6. A method as described in claim 1, further comprising verifying a file that includes a hash is signed with a certificate, wherein the at least one identity comprises the hash.

7. A method as described in claim 1, wherein the plurality of conditions is included in a policy that is configured to perform the automatically elevating.

8. A method as described in claim 1, further comprising obtaining the plurality of conditions from a service available via a network.

9. One or more computer-readable memory devices comprising instructions that are
executable to generate a background service that is operable to:
verify that an identity, which is one of multiple identities associated with a program that each serve to describe the program, is bound to data that forms the program responsive to a request for security access beyond a security level that is currently specified for the program, the multiple identities including at least one of a path, a manufacturer, a name, or a version of the program, the request made by another program on behalf of the program, and the security access enabling the program to perform actions that are restricted for the program at the level that is currently specified for the program; and
elevate the security level for the program beyond the level that is currently specified for the program independent of a security level of the other program and without manual authorization when the identity corresponds to one of a plurality of conditions that is associated with automatic security level elevation, at least one of the plurality of conditions corresponds to elevating the security level for a program based on a manufacturer of said program.

10. One or more computer-readable memory devices as described in claim 9, wherein the identity is a hash included in a file that is signed with a digital signature and a certificate.

11. One or more computer-readable memory devices as described in claim 9, wherein the plurality of conditions is included in a list that is obtained from a network service.

12. One or more computer-readable memory devices as described in claim 9, wherein the instructions are further executable to cause the background service to present a prompt that requests manual authorization in response to a check that indicates that the identity corresponds to one of the conditions that is associated with manual authorization to elevate the security level beyond the security level that is currently specified for the program.

13. One or more computer-readable memory devices as described in claim 12, wherein the instructions are further executable to cause the background service to include at least one of the multiple identities in the plurality of conditions upon receipt of the manual authorization.

14. One or more computer-readable memory devices as described in claim 9, wherein the program comprises an application.

15. One or more computer-readable memory devices comprising instructions that are executable to:
check an identity of a program having multiple identities that each describe the program with a list of conditions responsive to a request for elevated security access of the program, the multiple identities including at least one of a path, a manufacturer, a name, or a version of the program, the request made by another program on behalf of the program, and the identity being associated with a hash with data that forms the program, in which the hash is included in a file signed with a certificate, each of the conditions:
corresponds to particular identities such that correspondence of the checked identity to a condition does not indicate correspondence of another one of the identities that describes the program to the condition and non-correspondence of the checked identity to the condition does not indicate non-correspondence of the other identities to the condition; and
is associated with a procedure that is to be performed before the program's security access is elevated above a current level of access to permit the program the elevated security access;
at least one of the conditions is associated with a procedure to elevate the security access when the identity matches the condition independent of an identity of a user of the program; and
elevate the program's security access automatically when the identity of the program corresponds to one of the conditions in the list that indicates that the elevated security access is permitted and the certificate is associated with the one of the conditions, the security access of the program being elevated independent of the other program's security access.

16. One or more computer-readable memory devices as described in claim 15, wherein the instructions are further configured to obtain the list from a service via a network.

17. One or more computer-readable memory devices as described in claim 15, wherein the instructions are further configured to execute as a background service for one or more applications.

18. One or more computer-readable memory devices as described in claim 15, wherein the instructions are further executable to present a prompt that requests credentials when the identity does not correspond to at least one of the conditions.

19. One or more computer-readable memory devices as described in claim 15, wherein at least one of the multiple identities comprises an identity that is not a path that is usable to access the program.

20. One or more computer-readable memory devices as described in claim 15, wherein the instructions are further executable to include one or more of the multiple identities in the list upon receipt of a specified number of manual authorizations.

* * * * *